United States Patent

[11] 3,634,873

[72] Inventor: Satoshi Nishimura
Osaka, Japan
[21] Appl. No.: 45,283
[22] Filed: June 11, 1970
[45] Patented: Jan. 11, 1972
[73] Assignee: Sanyo Electric Co., Ltd.
Osaka, Japan
[32] Priorities: June 12, 1969
[33] Japan
[31] 44/46384;
July 2, 1969, Japan, No. 44/52611

[54] HERMETICALLY SEALED DC-MOTOR-COMPRESSOR UNIT
13 Claims, 10 Drawing Figs.

[52] U.S. Cl. .................................................. 318/254,
310/112, 310/88
[51] Int. Cl. ............................................... H02k 29/00
[50] Field of Search .......................... 310/87, 55,
112, 88; 318/254, 138

[56] References Cited
UNITED STATES PATENTS

| | | | |
|---|---|---|---|
| 3,509,438 | 4/1970 | Kachuk | 318/254 X |
| 3,185,910 | 5/1965 | Knapp | 318/254 X |
| 2,725,012 | 11/1955 | Zimsky | 310/87 X |
| 3,096,467 | 7/1963 | Angus et al. | 318/254 X |
| 3,111,090 | 11/1963 | White | 310/87 X |
| 3,328,659 | 6/1967 | Ryno | 318/138 |

Primary Examiner—G. H. Simmons
Attorney—Darby & Darby

ABSTRACT: A hermetically sealed DC motor-compressor unit comprises a compressor component, a DC motor component including a permanent magnet rotor and a stator, said stator having a plurality of phase-windings and transistor-switching elements for energizing the respective phase windings, reed switch means for controlling said transistor-switching elements, and a hermetically sealed casing enclosing therein the compressor component, the DC motor component and the reed switch means. Any time differences which may caused due to the deflection of the magnetic flux for operating the reed switches and due to the delay of the switching operation of the reed switches per se are compensated by adjusting the length of the shielding member and by adjusting the relative location between the reed switches and their respective magnets, respectively.

PATENTED JAN 11 1972

INVENTOR
SATOSHI NISHIMURA
BY
Darby & Darby
ATTORNEYS

HERMETICALLY SEALED DC-MOTOR-COMPRESSOR UNIT

BACKGROUND OF THE INVENTION

This invention relates to a hermetically sealed motor-compressor. More particularly, this invention relates to a hermetically sealed motor-compressor unit driven by a DC-motor having at least one magnetically operative reed switch incorporated therein.

Refrigerators and air conditioners which are installed for use on such moving vehicles as motor cars and ocean liners generally include a hermetically sealed motor-compressor unit adapted to be operated from a suitable DC-power source. In operating the motor-compressor unit aboard such vehicles, the motor-compressor unit may directly be driven by a direct current motor. Alternatively, direct current from a DC power source may be converted into alternating current by a suitable inverter to energize an AC motor-compressor unit.

When it is intended to use an AC motor-compressor unit i.e. a motor-compressor having an AC drive motor, an inverter of greater capacity is required to cope with the compressor's distinct load characteristic wherein the starting torque is abnormally higher than the normal operating torque. This results in a substantial cost increase of the entire system. On the other hand a DC motor-compressor unit, i.e. a compressor unit having a DC drive motor incorporated is to be used, the refrigerant and lubricant in the hermetic unit are prematurely destroyed or degraded due to the arc formation at the commutater brush of the DC motor component, resulting in a shorter operating life of the unit.

Accordingly, the so-called brushless type of DC drive motor may preferably be incorporated into such hermetic DC motor-compressor unit.

Prior art brushless DC-motor is rotated as the result of an interaction between the magnetic flux produced by a permanent magnet rotor and pulsed-exciting current through the stator windings. The requisite pulsed-exciting current is conventionally produced by means of a transistor oscillator circuit and supplied through the stator winding in order to drive the magnet rotor of the brushless DC-motor. This conventional type of brushless DC-motor when employed to drive a compressor unit fails to provide a satisfactory operating efficiency.

Therefore, it is a primary object of this invention to provide a new and improved hermetically sealed motor-compressor unit adapted to be driven by a DC-motor having magnetically operative reed switch means.

It is another object of this invention to provide a new and improved hermetic motor-compressor unit adapted to be driven by a DC-motor including magnetically operative reed switch means and having an operating efficiency much greater than that attained by conventional units.

It is a further object of this invention to provide a simple in construction, compact in size hermetic motor-compressor unit adapted to be driven by a DC-motor including magnetically operative reed switch means.

It is a still further object of this invention to provide a new and improved hermetic motor-compressor unit adapted to be driven by a DC-current motor which is of a self-starting type and eliminates the necessity of starting means.

SUMMARY OF THE INVENTION

In accordance with the objects of the invention, a hermetically sealed DC motor-compressor unit comprises a compressor component, a DC motor component for driving the compressor component, switching means for controlling the flow of energizing current through the stator windings of the motor component, and a hermetically sealed casing enclosing therein the compressor component, the DC motor component and switching means. The DC motor component includes a permanent magnet rotor and a stator. The stator may have a plurality of phase windings and transistor-switching elements for energizing the respective phase windings. Switching means includes at least one magnetically operative reed switch which is connected to the transistor-switching elements.

In a preferred embodiment of the invention, switching means for controlling the transistor switch elements comprises at least one combination of a magnet operative reed switch with a cooperating magnetic for operating the reed switch and at least one movable shielding member for periodically shielding the reed switch from the cooperating magnet. The combination of a magnetically operative reed switch with a cooperating magnet is secured directly or indirectly to the stator of the motor component while the movable shielding members is mounted on the motor component.

More preferably, switching means comprises a plurality of magnetically operative reed switches which are connected to the transistor switching elements for the respective phase winding a plurality of cooperating magnets for operating the respective reed switches and at least one movable shielding member for periodically and successively shielding those reed switches from their respective corresponding magnets. The reed switches and their cooperating magnets may be arranged on stationary members secured to the stator of the motor component while the shielding member is mounted on the rotor of the motor component so as to move together with the rotor. The reed switches and their corresponding magnets are circularly arranged, respectively, with the same angular intervals, and shielding member is continuously movable with said rotor at the space between the reed switches and their corresponding magnets so as to successively shield and unshield the reed switches from their respective magnets.

In a further embodiment of the invention a shielding disk is secured to the shaft of the rotor for shielding the magnetic flux from the permanent magnet of the rotor and the shielding member of the switching means is formed as an extension of this shielding disk. The permanent magnet rotor may be fixed to the rotor shaft via a soft metal sleeve and the shielding disk for shielding magnetically form the permanent magnet of the rotor may be mounted on this soft metal sleeve. It is also preferred to form a pair of arc-shaped shielding plates symmetrically at the opposite edges of the shielding disk.

According to another preferred embodiment of the invention the length of the shielding member in the direction of movement thereof is so dimensioned as to compensate time differences at the beginning and at the end of the shielding operation which are caused by deflection of the magnetic flux toward the shielding member. The reed switches may preferably be located in such a relative position with respect to their respective corresponding magnets that the timelag of switch operation of the reed switch is compensated.

A BRIEF DESCRIPTION OF THE DRAWINGS

DETAILED DESCRIPTION OF THE PREFERRED EMBODIMENTS

Figure 1:
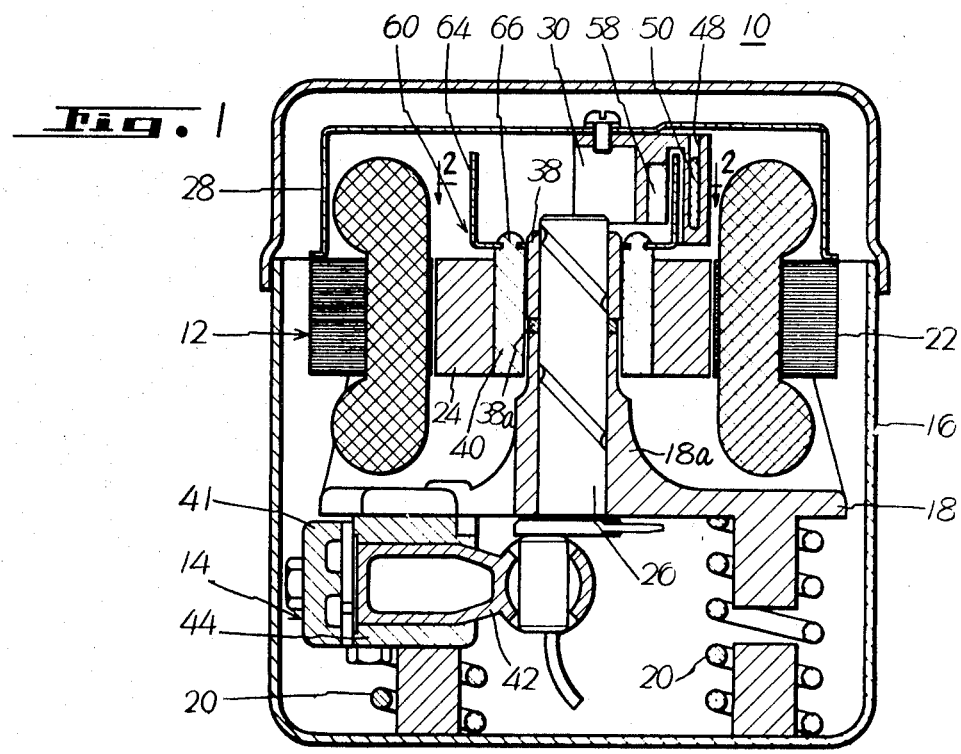
FIG. 1 is a vertical sectional view of a hermetically sealed DC motor-compressor unit embodying the invention.

With particular reference to the drawings, there is illustrated in FIG. 1 a hermetically sealed motor-compressor unit 10 comprising a DC motor component 12 and a compressor component 14 which are housed within a hermetic casing 16. The motor and compressor components 12 and 14 are mounted on a unitary support frame 18 which is resiliently held in place within the casing 16 by the three springs 20. The support frame 8 includes a central shaft-receiving portion 18a extending upwardly through the space in the hermetic casing.

The DC motor component 12 of the unit 10 comprises a stator 22, a rotor 24 and a shaft 26 attached to the rotor for rotation therewith.

A suitable support member or cover such as designed by the reference numeral 28 is placed over and secured to the upper end of the stator core 22 for supporting a mounting block 30 which will be used to support the constituent parts of the switching mechanism hereinafter described. The stator core 22 is integrally provided with a plurality of salient pole sections. In the particular three-pole motor components in the illustrated exemplification, a total of six salient pole sections 22a, 22b, 22c, 22d, 22e and 22f are formed.

A coil is wound around each of the salient pole sections 22a–22f so that a north pole is provided at individual pole section in the energized condition of the coils. These coils are connected in series in an alternate fashion to form three stator windings 32, 34 and 36. The rotor 24 comprises a permanent magnet which is magnetized to provide four pole sections designated by N and S. The permanent magnet rotor is mounted in a press fit on the shaft 26 via an annular rotor support 38. In order to avoid cracks or breakage to occur in the rotor during the press-fitting operation a sleeve member 40 of a suitable soft metal such as lead, tin and antimony may preferably be interposed between the rotor 24 and the annular rotor support 38. The shaft 26 is in turn rotatably received in the elongated bore of the central shaft-receiving portion 18a of the support frame 18. The annular rotor support 38 bears against the upper surface of the central shaft-receiving portion 18a and is supported thereby against any axial fall down. For the smooth and easy rotation of the rotor 24 a thrust ring 38a is placed between the upper surface of the central portion 18a and the bottom surface of the annular rotor support 38 as shown in FIG. 1.

The compressor component 14 of the unit is constructed such that during operation fluid substance such as a refrigerant may be discharged out of the hermetic casing 16 through a cylinder head 41 as the result of the reciprocating motion of a piston 42 in a cylinder 44 which is mounted to the underside of the support frame 18. The piston 42 is operatively connected through a suitable drive mechanism to the shaft 26 in such manner that the rotational movement of the shaft may cause a reciprocating motion of the piston 42 in the cylinder 44.

Figure 2:
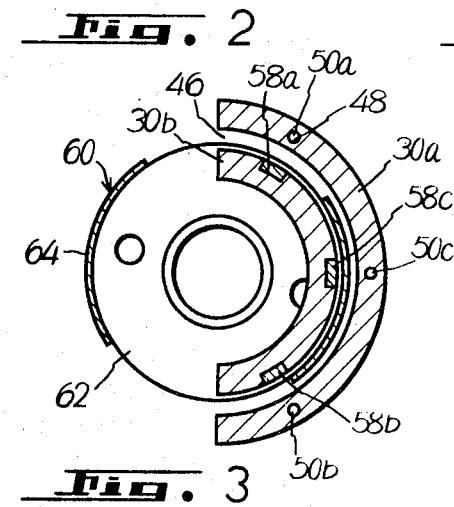
FIG. 2 is a partial sectional view taken along line 2—2 of FIG. 1 and showing the details of the construction of the magnetically operative reed switch mechanism incorporated in the motor-compressor unit of FIG. 1.
Figure 9:
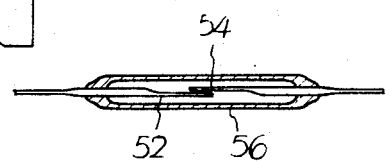
FIG. 9 is enlarged sectional view of the magnetically operative reed switch in the switching mechanism for the motor component.

The mounting member 30 of generally semicylindrical shape is suitably fastened to the inner surface of the support cover 28 and comprises an outer arcuate-mounting portion 30a and an inner arcuate-mounting portion 30b as shown in FIG. 2. A downwardly extending arcuate passage or gap 46 is formed between outer and inner mounting portions 30a and 30b. Three elongated holes 48 are formed spaced 60° angular distance away from each other in the outer mounting portion 30a. Magnetically operative reed switches 50a, 50b and 50c are accommodated within the holes 48. As shown in FIG. 9, each reed switch comprises a pair of magnetic and electrically conductive contact blades or reeds 52 and 54 encapsulated within a hermetically sealed glass tube or receptacle 56. A suitable inert gas is contained in the tube 56. Meanwhile, three similar actuating permanent magnets 58a, 58b and 58c are mounted to the inner mounting section 30b in positions opposite and corresponding to the three magnetic reed switches 50a, 50b and 50c.

Figure 3:
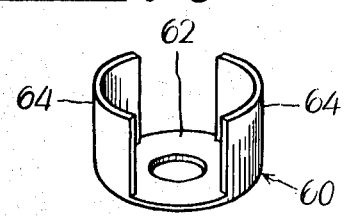
FIG. 3 is a perspective view of the magnetic shield element forming a part of the magnetically operative switching mechanism.
Figure 4:
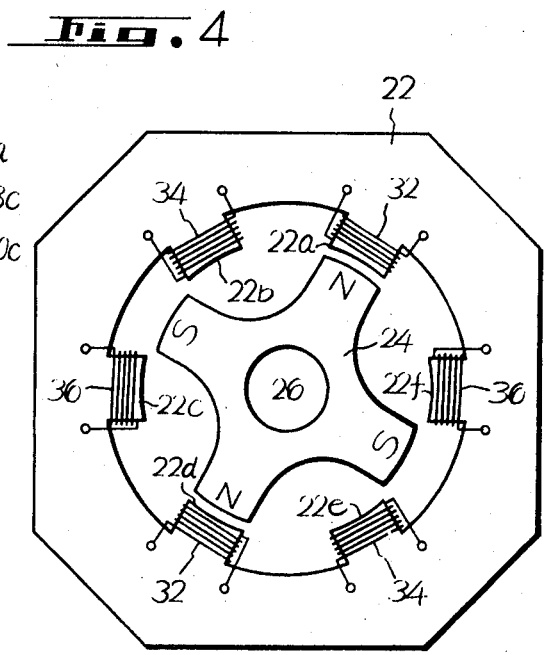
FIG. 4 is a diagrammatic view of the motor component of the unit illustrating relative positions between the stator and the rotor.
Figure 5A:
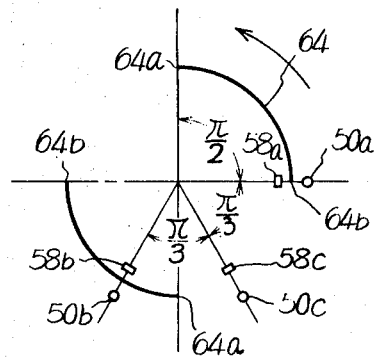
FIG. 5A is a diagrammatic view showing the relative location of the magnetically operative reed switch elements and their corresponding cooperating magnets at the state where the positional correction according to this invention has not yet been applied.

A magnetic shield member 60 which forms together with the reed switches and actuating magnets a switching mechanism for controlling the energization of stator windings comprises an annular base 62 and a pair of curved magnetic shield elements 64 integrally formed along the peripheral edge of the annular base to extend vertically upward with respect to the base 62. This magnetic shield member 60 is fixedly connected for rotation with the magnet rotor 24 to the rotor support 38 by attaching the annular base 62 onto the upper end surface of the rotor support as by welding, riveting shown at 66. As illustrated in FIGS. 2 and 3, the pair of magnetic shield elements 64 are disposed in diametrically opposite relation and each element has an theoretical angular dimension of 90° with respect to the axis of the annular base 62 (Fig. 5A). In other words, each of the curved magnetic shield elements 64 extends peripherally 90° with respect to the center of the annular base 62. Further, the curvature and vertical dimension of the elements 64 are such that when the magnetic shield member 60 is rotated together with the rotor 24 during the operation of the unit the pair of elements 64 conveniently pass through the downwardly opening arcuate passage 46 formed between outer and inner mounting sections 30a and 30b to control the switching operation of the magnetic reed switches 50a, 50b and 50c as hereinafter described in more detail.

Figure 6:
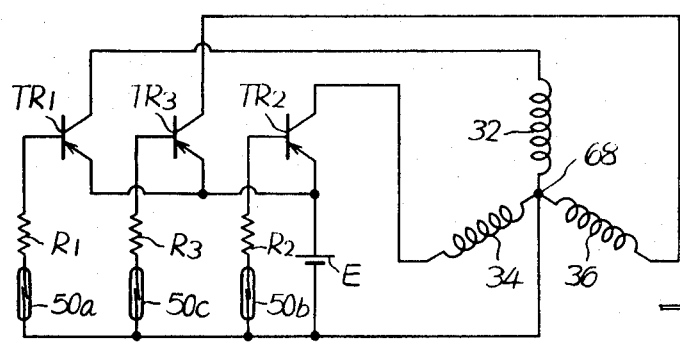
FIG. 6 is a diagrammatic illustration of the operating circuit and circuit components of the motor-compressor unit according to this invention.

The circuit arrangement of the present motor-compressor unit 10 together with its operation is now explained referring particularly to FIG. 6. As shown in the drawing, three stator windings 32, 34 and 36 are star-connected in three-phase circuits. The center junction 68 of the star connection is joined to the negative terminal of a DC power source E, while the other ends of the windings 32, 34 and 36 are connected to the collector of transistors TR$_1$, TR$_2$ and TR$_3$, respectively. Emitters of these transistors are all connected to the positive terminal of the DC power source E. The base of transistor TR$_1$ is connected via a limiting resistance R1 and the magnetic reed switch 50a to the negative terminal of the DC power source E. The bases of transistors TR2 and TR3 are similarly connected to the negative terminal of the DC power source through a resistance R2, magnetic lead switch 50b and a resistance R3, magnetic lead switch 50c respectively.

Assuming that the rotor 24, thus the magnetic shield member 60 is in an angular position as illustrated in FIG. 5A, one of the shield elements 64 shields reed switch 50b from the magnetic flux of the actuating permanent magnet 58b keeping this switch open, while the remaining two reed switches 50a and 50c are closed by the influence of the magnetic flux of the actuating magnets 58a and 58c since the shield elements 60 are out of the magnetic flux paths of the actuating magnets 58a and 58c, thus keeping the switches exposed to magnet forces. Accordingly corresponding two stator windings 32 and 36 are energized to produce north pole at salient pole sections 22a, 22c, 22d and 22f, which drives the rotor 24 in counterclockwise direction as is readily be understood by those skilled in the art.

A 30° counterclockwise rotation of the rotor 24 from the position shown in FIG. 5A brings one of the shield elements 64 into a position where it effectively keeps two magnetic reed switches 50b and 50c out of the influence of corresponding actuating magnets 58b and 58c while permitting the reed switch 50a exposed to the magnetic flux of the actuating magnet 58a. With only the reed switch 50a in its continued closed position, the stator winding 32 is energized to magnetize the salient pole sections 22a and 22d into a north pole. Resultant effect of magnetic attraction and repulsion between the stator and rotor is a continued counterclockwise rotation of the rotor 24, which drives the piston 42 of the compressor component 14 in reciprocation.

Upon further 30° rotation of the rotor 24 actuating magnets 58d and 58b close the contact blades in the magnetic reed switches 50a and 50b in a substantially similar manner as explained above. Thus, the stator windings 32 and 34 are energized to provide a north pole at the salient pole sections 22a, 22b, 22d and 22e resulting in further clockwise rotation of the rotor 24.

As is clear from the above description, the rotor 24 of the motor component 12 is readily self-started at any angular position.

Figure 7:
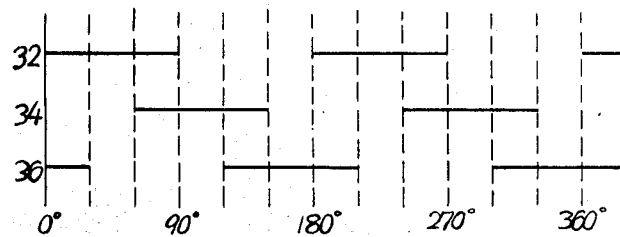
FIG. 7 is a diagrammatic illustration showing the energized conditions of the stator windings in the motor component of the unit.
Figure 8:
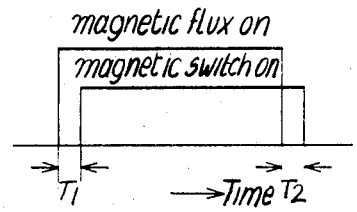
FIG. 8 is a diagrammatic illustration showing the advanced and delayed operation of the magnetic reed switch with respect to the operating magnetic flux.

FIG. 7 clearly illustrates the manner in which rotary magnetic field is produced around the rotor by the circuit arrangement mentioned above.

In actual practice, however, magnetic reed switches do not necessarily operate the moment the shield elements enter into or leave out of the space between corresponding pair of actuating magnet and the reed switch. This is due to undesirable magnetic flux deflection caused by the rotating shield member and operational delay inherent to the magnetic reed switches. Accordingly, a relative positioning of the magnetic shield member 32 with respect to the actuating magnets and reed switches as shown in FIG. 5A which is a theoretically concluded one does not provide maximum available efficiency of rotation during the normal operation of the motor.

More specifically, as the leading edges 64a of the shield elements 64 approach close to the gap between any of the cooperating reed switch and actuating magnet, the magnetic flux from the magnet to the reed switch is substantially deflected toward the approaching leading edge because of a difference in reluctance between the surrounding atmosphere and shield elements. Similarly, as the rear edge 64b of the shield elements 64 leave out of the gap between the cooperating reed switch and actuating magnet, the magnetic flux path from the magnet to reed switch is deflected from the normal expected course toward the leaving rear edge 64b of the shield element. The effect of this flux deflection is that the magnetic reed switches 50a, and 50b and 50c are actuated into its closed position by the magnetic flux of the magnets 58a, 58b and 58c only after the rear edges 64b of shield elements 64 have been rotated a slight angular distance $S_1$ away from the midpoint between cooperating pairs of actuating magnets and reed switches. Similarly, the magnetic reed switches are released into their open position when the front or leading edges 64a of the rotating shield elements reach close to but before they enter midpoint between cooperating pairs of actuating magnets and reed switches. That is, when the leading edges 64a of the rotating shield elements 64 reach to a point which is a slight angular distance $S_2$ ahead of the cooperating pairs of actuating magnets and reed switches, the reed switches are prematurely released.

According to one aspect of this invention the above described undesirable lagged or premature operations of the magnetic reed switches are effectively corrected by displacing the position of rear edges 64b of the shield elements 64 an angular distance $S_1$ away from the position that shown in FIG. 5A in counterclockwise direction and the front edges 64a of the shield elements an angular distance $S_2$ away from the illustrated positions of FIG. 5A in clockwise direction. In one way, this is done by adjusting the angular extension or length of the shield elements.

Assuming that the motor component 12 of the present unit has a pole number of 2P a magnetic shield element may have an angular extension with respect to the center axis of the shield member as expressed by the following formula.:

$$2\pi/2-(S_1+S_2)$$

For obtaining better operating results, further measures should also be taken to compensate for delayed operations inherent to the magnetic reed switches which use mechanical switches contact means.

According to further aspect of this invention, denoting the timelag or delay time in closing operation of the magnetic lead switches 50a, 50b and 50 c as $T_1$ sec., and the delay time in releasing operation of the switches as $T_2$ sec., and the revolutions per second of the rotor 24 as R, the magnetic shield member 60 is positioned so that the rear and front edges 64b and 64a of the shield elements 64 may be angularly displaced in the direction of rotation of the rotor by another $2\pi RT1$ and $2\pi RT2$ respectively from the positional condition diagrammatically illustrated in FIG. 5A. Thus, the shield elements 64 may be formed to have an angular extension $2\pi R(T_1-T_2)°$ less than that determined to be optimum at the lower nonoperational speed of rotation of the shield member, for example, approximately 300 r.p.m. for 3,600 r.p.m.-rated motor speed. Further, the rear edges 64b of the shield elements 64 may be angularly displaced in the direction of rotation by $(2\pi RT_1)°$ from the position determined to be optimum at the above-mentioned slower rotational speed of the magnetic shield member. Alternatively, the leading edges 64a of the shield elements may be angularly displaced in the direction of rotation by $(2\pi RT_2)°$ from the optimum position as determined above.

The forgoing description makes it clear that in order to correct comprehensively both the premature or delayed operation of the reed switches caused by the flux deflections and the delayed operation inherent to the reed switches themselves the curved magnetic shield elements 64 of the member 60 are formed to have an angular extension as expressed by the formula:

$$[2\pi/2P-(S_1+S_2)-2\pi R (T_1-T_2)°]$$

Figure 5B:
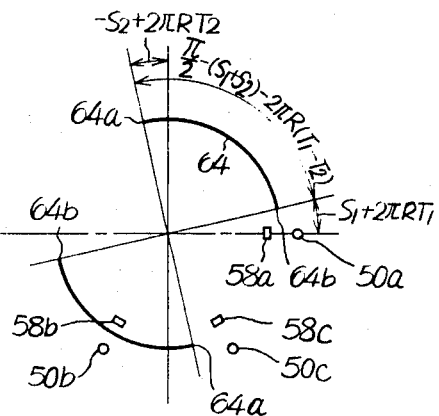
FIG. 5B is a diagrammatic view similar to FIG. 5A showing the relative location of the reed switches and their corresponding magnets after the positional correction according to this invention is applied.

Further, the magnetic shield member 60 is positioned such that the rear edges 64b of the elements 64 may be angularly displaced in the direction of rotation by $(2\pi RT_1)°$ from the position theoretically concluded and illustrated in FIG. 5A or the front edges 64a of the elements may be angularly displaced in the direction of rotation by $(2\pi RT_2)°$ from the theoretically concluded position as mentioned above. The shield elements are shown in FIG. 5B after the necessary dimentional and positional corrections according to this invention. With this arrangement of the switching mechanism, the motor component 12 provides itself a highly efficient DC-drive motor for the compressor component 14.

The annular base portion 62 of the shield member 64 can function so as to shield the magnetic force from the permanent magnet rotor 24 so that the magnetic action of each of the magnets 58a, 58b and 58c may not be disturbed.

For the purpose of preventing early malfunction of the switch assembly due to the wear of the contact blades the magnetic reed switches may be used in number two times as many as they are employed in the illustrated embodiment.

In such case additional reed switches may be connected in parallel to the base of each transistor. As is clear to those skilled in the art the magnetic shield member may have other suitable construction than that illustrated in the drawings.

While there has been shown and described the specific embodiment of the present invention it is to be understood that it is not limited thereto and it is intended by the appended claims to cover all such modifications as fall within the scope thereof.

1. A hermetically sealed DC motor-compressor unit comprising a compressor component; a DC motor component including a permanent magnet rotor and a stator, said stator having a plurality of phase windings and transistor-switching elements for energizing the respective phase windings; switching means for controlling said transistor-switching elements, said switching means comprising at least one combination of a magnetically operated reed switch with a cooperating magnet for operating said reed switch and at least one movable shielding member for periodically shielding said reed switch from its cooperating magnet; a first hermetically sealed casing enclosing therein said compressor component, said DC motor component and said switching means, and a further hermetically sealed casing for each said reed switch located within said first hermetically sealed casing.

2. A hermetically sealed DC motor-compressor unit as defined in claim 1 in which said combination of a magnetically operated reed switch with a cooperating magnet is secured to said stator while said movable shielding member is mounted on said rotor.

3. A hermetically sealed DC motor-compressor unit as defined in claim 1 in which the length of said shielding member in the direction of movement thereof is so dimensioned as to compensate for time differences at the beginning and at the end of the shielding operation which are caused by deflection of the magnetic flux toward said shielding member.

4. A hermetically sealed DC motor-compressor unit as defined in claim 1 in which said reed switch is located in such a relative position with respect to its corresponding magnet that the time lag of switching operation of said reed switch is compensated for.

5. A hermetically sealed DC motor-compressor unit as defined in claim 1 in which the length of said shielding member in the direction of the movement thereof is so dimensioned as to compensate for time differences at the beginning and at the end of the shielding operation which are caused by deflection of the magnetic flux toward said shielding member, and said reed switch is located in such relative position with respect to its corresponding magnets that the time lag of switch operation of said reed switch is compensated for.

6. A hermetically sealed DC motor-compressor unit as defined in claim 2 in which said shielding member includes a shielding disk secured to the shaft of the rotor for shielding the leakage magnetic flux from the permanent magnet of the rotor and said shielding member of said switching means is formed as an extension of said shielding disk.

7. A hermetically sealed DC motor-compressor unit as defined in claim 6 in which the permanent magnet rotor is fixed to the rotor shaft via a soft metal sleeve and said shielding disk is mounted on said soft metal sleeve.

8. A hermetically sealed DC motor-compressor unit as defined in claim 6 in which a pair of arc-shaped shielding plates are formed symmetrically at the opposite edges of said shielding disk to form said shielding member.

9. A hermetically sealed DC motor-compressor unit as defined in claim 6 in which the permanent magnet rotor is fixed to the rotor shaft by a soft metal sleeve.

10. A hermetically sealed DC motor-compressor unit comprising a compressor component; a DC motor component including a permanent magnet rotor and a stator, said stator having a plurality of phase windings and transistor-switching elements for energizing the respective phase windings; switching means for controlling said transistor-switching elements, said switching means comprising a plurality of magnetically operated reed switches which are respectively connected to said transistor-switching elements, a plurality of cooperating magnets for operating the respective reed switches and at least one movable shielding member for periodically and successively shielding said reed switches from their respective cooperating magnets; and a hermetically sealed casing enclosing therein said compressor component, said DC motor component and said switching means.

11. A hermetically sealed DC motor-compressor unit as defined in claim 10 in which said reed switches and said cooperating magnets are arranged on a stationary member secured to said stator of said DC motor component while said shielding member is mounted to move with the rotor of said DC motor component.

12. A hermetically sealed DC motor-compressor unit as defined in claim 11 in which said reed switches and their corresponding magnets are circularly arranged with the same angular interval between two adjacent reed switches and their corresponding magnets, and said shielding member is continuously movable with said rotor at the space between said reed switches and their corresponding magnets so as to successively shield and unshield said reed switches from their respective magnets.

13. A hermetically sealed DC motor-compressor unit as defined in claim 10 further comprising additional means for hermetically sealing each of said reed switches.

* * * * *